Figure 1:
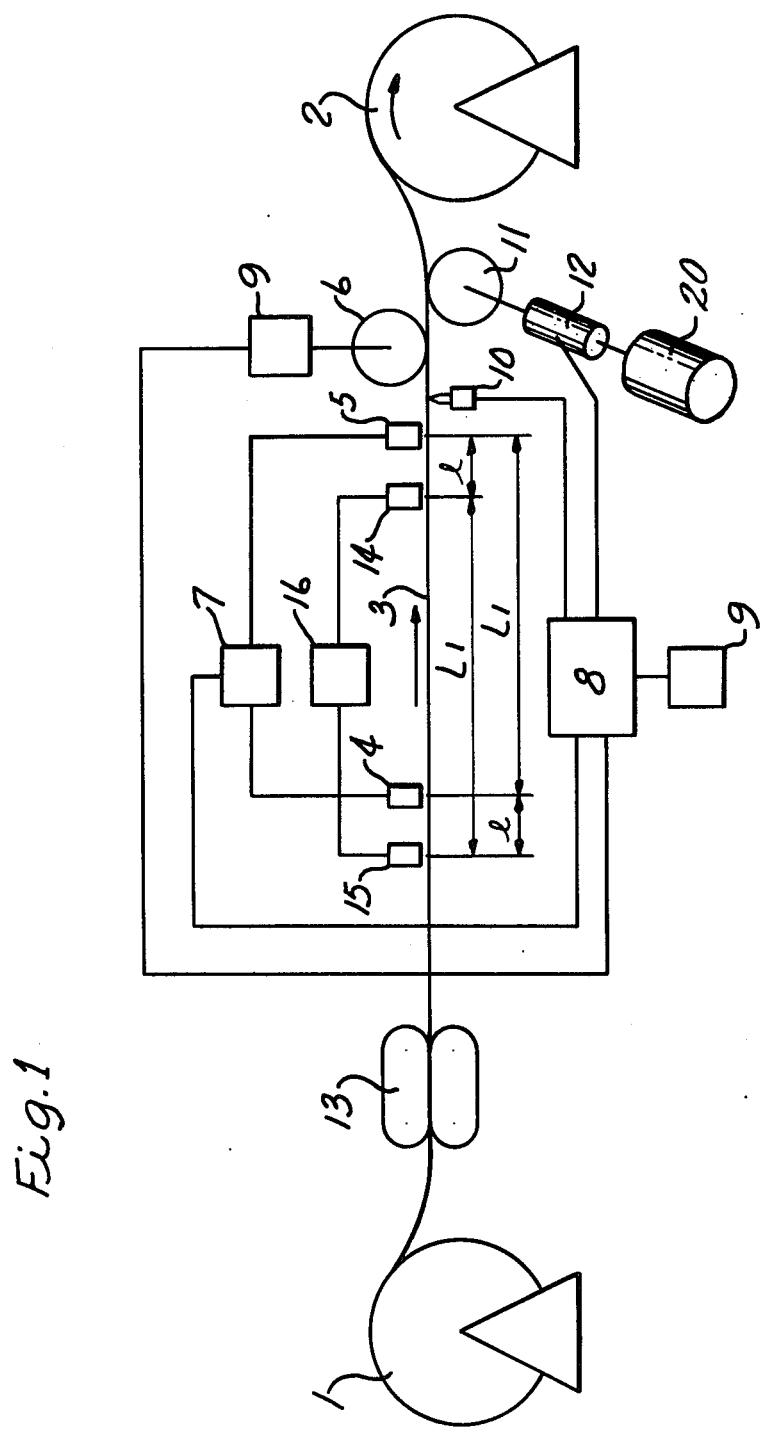

United States Patent [19]

Uesugi et al.

[11] 4,041,610
[45] Aug. 16, 1977

[54] APPARATUS FOR PRECISE MEASUREMENT OF THE LENGTH OF LONG LENGTH MATERIALS

[75] Inventors: Minoru Uesugi; Susumu Ihara; Katsumi Mizuuchi, all of Osaka, Japan

[73] Assignee: Sumitomo Electric Industries, Ltd., Osaka, Japan

[21] Appl. No.: 693,213

[22] Filed: June 4, 1976

Related U.S. Application Data

[63] Continuation of Ser. No. 549,948, Feb. 14, 1975, abandoned.

[51] Int. Cl.$^2$ .............................................. G01B 7/04
[52] U.S. Cl. .................................. 33/127; 324/34 L
[58] Field of Search ........................ 33/125 T, 127; 324/34 L, 38

[56] References Cited

U.S. PATENT DOCUMENTS

| 2,989,690 | 6/1961 | Cook | 33/127 X |
| 3,236,124 | 2/1966 | Rhoades | 33/125 T X |
| 3,303,419 | 2/1967 | Gith | 33/127 X |
| 3,315,159 | 4/1967 | Gith | 33/127 X |
| 3,466,535 | 9/1969 | Sterns et al. | 33/127 X |
| 3,718,976 | 3/1973 | Nippert | 33/129 |
| 3,970,921 | 7/1976 | Ito | 324/34 L |

FOREIGN PATENT DOCUMENTS

| 1,928,071 | 5/1970 | Germany | 33/127 |
| 351,767 | 7/1931 | United Kingdom | 324/38 |

*Primary Examiner*—Charles E. Phillips
*Attorney, Agent, or Firm*—Carothers and Carothers

[57] ABSTRACT

The present invention relates to an apparatus for precise measurement of the length of long length materials which measures the length of a long length material such as electric wire, cable, etc. basically unit length by unit length in an inchworm manner by applying magnetic marks on said material and sensing them downstream while making correction for elongation of the material due to temperature and tension, and which measures only an odd length less than the unit length by means of, for example, a counter wheel.

3 Claims, 1 Drawing Figure

APPARATUS FOR PRECISE MEASUREMENT OF THE LENGTH OF LONG LENGTH MATERIALS

This is continuation of application Ser. No. 549,948 filed Feb. 14, 1975 now abandoned.

OBJECTS OF INVENTION

The apparatus for precise measurement according to the present invention carries out the measurement unit length by unit length in an inchworm manner basically by forming a magnetic powder layer locally on the surface of a long length material, then applying a magnetic mark thereon and detecting the magnetic mark at a distance of a unit length from the location where the magnetic mark was applied, causing a magnetic mark to be applied at the same time on the next powder layer, and repeating this procedure to complete the measurement. In making the measurement unit length by unit length, the tension and temperature of each unit length of the long length material are measured and correction is made ot obtain the length for standard tension and standard temperature. On the other hand, only an odd-length which is shorter than the unit length is measured by means of a counter wheel. There are slipping errors for the measurement by a counter wheel, but the counter wheel is not used for the measurement of most of the long length material.

The present invention provides an apparatus which is simple and easy to handle and which makes it possible to improve the accuracy of measurement by unit length in spite of changes in the tension and temperature of the long length material by adopting a longer unit length and by reducing slip errors through the use of a counter wheel only for the measurement of an odd length shorter than the unit length.

DESCRIPTION OF THE INVENTION

The present invention relates to an apparatus for precise measurement of the length of long length materials such as electric wires, cables, etc. More particularly, it relates to an apparatus for precise measurement of the length of long length materials, wherein a long length material is basically measured unit length by unit length in an inchworm way, with correction made in accordance with the tension and temperature of the long length material, and only an odd length which is shorter than the unit length is measured by means of, for example, a counter wheel.

An object of the present invention is to provide an apparatus for precise measurement of the length of long length materials which accurately applies a mark to a travelling long length material by means of a magnetic marking device and detects this mark by means of a magnetic mark detector located downstream to measure the length and at the same time to cause the long length material to be marked by means of said marking device.

Another object of the present invention is to provide an apparatus for precise measurement of the length of long length materials which previously applies magnetic powder to a travelling long length material locally at the position where a mark is to be applied.

Another object of the present invention is provide an apparatus for precise measurement of the length of long length materials which measures the tension and temperature of a travelling long length material and thereby obtains a duly corrected value of measurement.

Another object of the present invention is to provide an apparatus for precise measurement of the length of long length material which measures a long length material basically unit length by unit length in an inchworm manner and counts by a counter wheel only an odd length which is shorter than the unit length.

Further objects and advantages of the apparatus and method of the present invention will become apparent from the following detailed description when read in connection with the accompanying drawing.

FIG. 1 is a schematic diagram illustrating an example of the apparatus for precise measurement of long length materials of the present invention.

Now an example of an apparatus for precise measurement of long length materials according to the present invention will be explained with reference to the drawing.

Along the line of progress of a long length material such as an electric wire or cable or the like which is paid out from the supply stand 1 and taken up by the take-up stand 2 are provided a tension-capstan 13 which tensions the long length material 3 in the direction reverse to the direction of its travel, a magnetic powder application device 15 which applies magnetic powder to the surface of the long length material 3, a marking device 4 which applies a mark to the magnetic powder, a mark detector 14 such as a magnetic mark detector which is located at a distance of a unit length $L_1$ from the magnetic powder application device 15, another mark detector 5 such as a magnetic mark detector which is located at a distance of the unit length $L_1$ from the marking device 4, a temperature measuring device 10 which measures the temperature of the long length material, a counter wheel 6 which is in contact with the long length material 3, and a driving means or capstan 11 which moves the long length material 3.

The tension capstan 13 is of such construction that it presses the long length material 3 from above and below and that it applies a braking force of any desirable value to the long length material against its travel.

Between the capstan 11 and the motor 20 is provided a tension measuring device such as a torque meter which can measure the tension of or torque applied to the long length material 3.

A marking device 16 is connected between the magnetic powder application device 15 and the mark detector 14. Likewise, a marking control device 7 is connected between the mark detector 14 and the mark detector 5. The marking control deivce 7 is connected to a mark counter 8 which has a built-in small sized electronic computer or the like.

In addition, an odd length counter 9 is connected to the counter wheel 6, and the mark counter 8 is connected to the odd length counter 9.

With the apparatus for precise measurement of long length materials of the afore-mentioned construction, a layer of magnetic powder is produced by applying to the outer surface of the long length material 3 a mixture of magnetic powder such as iron oxide and parafffin heated to a temperature of approximately 60° C or a mixture of magnetic powder and a rapid drying solvent such as lacquer from the magnetic powder application device 15 at the same time as the motor 20 is charged with electric current. Then, the travel of the long length material 3 for a distance $l$ is detected by means of the counter wheel 6 and the marking device 4 applies a magnetic mark to the magnetic powder-coated long length material of approximately every 500 ms. When the counter wheel 6 has detected the travel for the distance $l$, the measurement by means of the counter wheel 6 comes to an end for the time being. When the magnetic mark is applied to the long length material 3 by this marking device 4 reaches the mark detector 14, the mark detector 14 detects the magnetic mark and, via the marking control device 16, actuates the magnetic powder application device 15 to have the layer of magnetic powder formed on the long length material. When the magnetic mark reaches the mark detector 5, it detects the magnetic mark and, via the marking control device 7, actuates the marking device 4 to have a magnetic mark applied. At this time the magnetic powder layer on the surface of the long length material is passing the area where the marking is done. That is to say, the distance between the magnetic powder application device 15 and the mark detector 14 is the unit length $L_1$, and these are both upstream of the marking device and mark detector 5 respectively for the same distance $l$ along the travel of the long length material 3. Thus, the magnetic mark to be applied on the magnetic powder layer never falls off the layer, but is always applied on the layer. Moreover, since the magnetic powder is applied for 10-odd centimeters in the longitudinal direction, the magnetic mark never falls off the layer.

At the same time as it actuates the marking device 4, the marking control device 7 actuates the mark counter 8 to count the marks.

The temperature of the long length material 3 measured by the temperature measuring device 10 and the tension of the long length material measured by the tension measuring device 12 are input to the mark counter 8 and correction value for the unit length $L_1$ is calculated by the small sized electronic computer built in the mark counter 8 in accordance with temperature coefficients and Young's modulus previously input therein. With the long length material 3 moving on continuously, the marks are thus counted by the mark counter 8 and at the same time the calculated value is duly added to the cumulative measurement value.

In order to measure an odd length which is shorter than the unit length $L_1$, the odd length counter 9 is reset by a signal issued by the mark detector 5 upon detecting the mark. The odd length counter 9 being thus activated, the odd length $L_2$ from the marked point of the long length material 3 is obtained from the number of revolutions of the counter wheel 6 and is added to the measurement value so far obtained to complete the measurement of the length.

With the apparatus according to the present invention, measurement is basically made unit length by unit length in an inchworm manner using a marking device 4 and a mark detector 5 and an odd length shorter than the unit length is measured by a counter wheel. In consequence of this, it is possible to have a long unit length between the marking device and the mark detector.

As a result, it becomes possible to reduce the cumulative error resulting from the unit by unit measurement and to enhance the measurement accuracy.

With the apparatus according to the present invention, the measurement of the length of a long length material is basically made unit length by unit length in an inchworm manner and a counter wheel is used only for measuring an odd length which is shorter than the unit length. There are slipping errors for the measurement by a counter wheel, but the counter wheel is not used for the measurement of most of the long length material. As a result of this, it is possible to reduce slip-error.

Moreover, the temperature and tension of the long length material are measured and correction is made for the elongation of the long length material caused by temperature and by tension. It is consequently made possible to still further improve the accuracy of measurement of long length material.

The use of the apparatus according to the present invention reduces the measurement error and makes it possible to accomplish measurement which brings about results more accurate by one place or more than the results obtained by the conventional methods of measurement.

We claim:

1. An apparatus for precise measurement of the length of longitudinally traveling long length materials comprising, a magnetic powder application device to apply a magnetic powder layer to the moving long length material, a magnetic device located downstream of said application device to periodically make a magnetic mark on said magnetic powder layer, a mark detector positioned a predetermined unit length downstream from said marking device to detect said magnetic marks as they pass by said detector, and operable upon detection of a magnetic mark to actuate said magnetic marking device to apply a magnetic mark to said magnetic powder layer, a second mark detector positioned said unit length downstream from said magnetic powder application device and operable upon detection of a magnetic mark to actuate said magnetic powder application device to apply said powder periodically to said material for marking.

2. The apparatus of claim 1 including a driving means for applying a driving torque to said material positioned downstream of said mark detector, means for measuring the tension and temperature of the long length material each time a mark is detected by said detector, and to convert these measured values to length variations from standard tension and temperature conditions and add said variations to the cumulative measurement value of said counting means wherein, said tension is measured by conversion from the value of the driving torque applied to the travelling long length material by said driving means, means to count the detected marks and thereby measure the long length material said unit length by unit length, and counting wheel means to engage the traveling long length material and measure any odd length thereof which is shorter than said unit length.

3. The apparatus of claim 1 wherein said magnetic powder is applied by said application device in combination with a settable material selected from the group consisting of paraffin and lacquer.

* * * * *